(12) United States Patent
Sun et al.

(10) Patent No.: US 8,880,321 B2
(45) Date of Patent: Nov. 4, 2014

(54) ADAPTIVE AIR CHARGE ESTIMATION BASED ON SUPPORT VECTOR REGRESSION

(75) Inventors: Jing Sun, Superior Township, MI (US); Kenneth R. Butts, Grosse Pointe Woods, MI (US); Jacob Edward Faust, Ann Arbor, MI (US)

(73) Assignees: Toyota Motor Engineering & Manufacturing North America, Inc., Erlanger, NY (US); The Regents of the University of Michigan, Ann Arbor, MI (US)

( * ) Notice: Subject to any disclaimer, the term of this patent is extended or adjusted under 35 U.S.C. 154(b) by 750 days.

(21) Appl. No.: 13/042,007

(22) Filed: Mar. 7, 2011

(65) Prior Publication Data

US 2012/0232772 A1    Sep. 13, 2012

(51) Int. Cl.
| | | |
|---|---|---|
| *G06F 19/00* | (2011.01) | |
| *G06F 7/60* | (2006.01) | |
| *G05B 17/02* | (2006.01) | |
| *F02D 41/18* | (2006.01) | |
| *G05B 13/04* | (2006.01) | |
| *F02D 41/24* | (2006.01) | |
| *F02D 41/00* | (2006.01) | |

(52) U.S. Cl.
CPC ........ *G05B 17/02* (2013.01); *F02D 2200/0404* (2013.01); *F02D 2200/0402* (2013.01); *F02D 2200/0408* (2013.01); *F02D 2200/0406* (2013.01); *F02D 41/18* (2013.01); *F02D 2041/001* (2013.01); *G05B 13/042* (2013.01); *F02D 2200/101* (2013.01); *F02D 41/2432* (2013.01); *F02D 41/2451* (2013.01)
USPC .............................................. 701/103; 703/2

(58) Field of Classification Search
USPC .......... 123/399, 403; 701/102, 103, 106, 114, 701/115; 73/114.32, 114.33, 118.2; 703/2, 703/8
See application file for complete search history.

(56) References Cited

U.S. PATENT DOCUMENTS

| | | | | |
|---|---|---|---|---|
| 5,270,935 A | * | 12/1993 | Dudek et al. ..................... | 701/99 |
| 5,273,019 A | * | 12/1993 | Matthews et al. ......... | 123/406.48 |
| 5,293,553 A | * | 3/1994 | Dudek et al. ................... | 701/102 |
| 5,394,331 A | * | 2/1995 | Dudek et al. ................... | 701/106 |
| 5,889,205 A | * | 3/1999 | Treinies et al. ............ | 73/114.32 |
| 6,035,639 A | | 3/2000 | Kolmanovsky et al. | |
| 6,363,316 B1 | | 3/2002 | Soliman et al. | |
| 6,405,122 B1 | * | 6/2002 | Yamaguchi ................... | 701/106 |

(Continued)

FOREIGN PATENT DOCUMENTS

WO    WO-2009/137297 A1    11/2009

OTHER PUBLICATIONS

Stotsky, A. & I. Kolmanovsky, "Application of input estimation techniques to change estimation and control in automotive engines," Control Engineering Practice, 10: 131-1383, 2002.*

(Continued)

*Primary Examiner* — Mahmoud Gimie
*Assistant Examiner* — John Zaleskas
(74) *Attorney, Agent, or Firm* — Gifford, Krass, Sprinkle, Anderson & Citkowski, P.C.

(57) ABSTRACT

Examples of the present invention include air charge estimation models using linear programming support vector regression (LP-SVR). Air model parameters may be updated during operation of a vehicle, allowing the air model performance to be improved in the presence of part-to-part variation and part aging.

16 Claims, 3 Drawing Sheets

(56) References Cited

U.S. PATENT DOCUMENTS

| | | | |
|---|---|---|---|
| 6,748,313 | B2 | 6/2004 | Li et al. |
| 6,805,095 | B2 | 10/2004 | Sun et al. |
| 7,194,392 | B2 * | 3/2007 | Tuken et al. .................. 703/2 |
| 7,293,555 | B2 | 11/2007 | Kato et al. |
| 7,440,839 | B2 | 10/2008 | Cesario et al. |
| 7,650,210 | B2 | 1/2010 | Breed |
| 7,783,409 | B2 | 8/2010 | Kang et al. |
| 2002/0133286 | A1 * | 9/2002 | Kolmanovsky et al. ...... 701/104 |
| 2004/0230368 | A1 * | 11/2004 | Kropinski et al. ............ 701/114 |
| 2006/0225710 | A1 * | 10/2006 | Tagliatela-Scafati et al. .............................. 123/486 |
| 2008/0051979 | A1 * | 2/2008 | Yasui et al. ................... 701/105 |
| 2008/0154811 | A1 * | 6/2008 | Grichnik et al. ................ 706/13 |
| 2009/0005953 | A1 | 1/2009 | Cesario et al. |
| 2009/0063115 | A1 * | 3/2009 | Lu et al. ............................ 703/8 |
| 2011/0093182 | A1 * | 4/2011 | Weber et al. .................. 701/102 |

OTHER PUBLICATIONS

Lu, Z.; Sun, J. & K. Butts, "Application of Linear Programming SVM-ARMA_2k for Dynamic Engine Modeling," 2010 American Control Conference, Jun. 30-Jul. 2, 2010.*

Lu, Z.; Sun, J.; Lee, D. & K. Butts, "Dynamic Engine Modeling Through Linear Programming Support Vector Regression," 2009 American Control Conference, Jun. 10-12, 2009.*

Bloch, G.; Lauer, F.; Colin, G. & Y. Chamaillard, "Combining Experiemental Data and Physical Simulation Models in Support Vector Learning," CRAN UMR 7039, 2007.*

Yuan, X.; Wang, Y. & L. Wu, "SVM-Based Approximate Model Control for Electronic Throttle Valve," IEEE Transactions on Vehicular Technology, vol. 57, No. 5, Sep. 2008.*

G. Bloch et al., "On Learning Machines for Engine Control", 2008, Springer-Verlag Berlin Heidelberg, Studies in Computational Intelligence (SCI) 132, pp. 125-144.*

Buckland, J.H. et al., "Practical Observers for Unmeasured States in Turbocharged Gasoline Engines," Proceedings of the American Control Conference, St. Louis, MO, USA, Jun. 10-12, 2009.

Stotsky, A. & I. Kolmanovsky, "Application of input estimation techniques to charge estimation and control in automotive engines," Control Engineering Practice, 10: 131-1383, 2002.

Gretton, A. et al., "Support vector regression for black-box system identification," Proceedings of the 11th IEEE Workshop on Statistical Signal Processing, 2001.

Jankovic, M. & S.W. Magner, "Air-charge estimation and prediction in spark ignition internal combustion engines," Proceedings of the American Control Conference, San Diego, California, Jun. 1999.

Grizzle, J.W. et al., "Improved Cylinder Air Charge Estimation for Transient Air Fuel Ratio Control," Proceedings of the American Control Conference, Baltimore, Maryland, Jun. 1994.

* cited by examiner

ADAPTIVE AIR CHARGE ESTIMATION BASED ON SUPPORT VECTOR REGRESSION

FIELD OF THE INVENTION

The invention relates to air charge estimation, for example in relation to engine control.

BACKGROUND OF THE INVENTION

Accurate air charge estimation is useful for electronic control of internal combustion engines, in particular to improve operating characteristics and fuel efficiency of engines.

Air enters the cylinders of the engine through an intake manifold. The air charge is defined as the amount of air the engine inducts for each combustion event. The engine may have various sensors, such as an engine speed sensor or manifold pressure sensor, but there is no direct measurement of the air charge for the cylinders. Accurate estimation of air charge is difficult over the wide range of possible engine operating conditions, and if the air charge is not accurately estimated, the air/fuel ratio and engine operation will be sub-optimized.

Hence, improved air charge estimation is useful for improving engine operation and the fuel efficiency of internal combustion engines. There are great environmental and cost benefits from improved fuel efficiency.

SUMMARY OF THE INVENTION

Examples of the present invention include air charge estimation models with reduced engine calibration complexity, and improved accuracy. An air model may include a throttle model and a cylinder flow model, and allows estimation of the air charge. Examples include throttle and/or cylinder flow models using linear programming support vector regression (LP-SVR). Such LP-SVR models give excellent results when used to model engine operation.

In some examples, air model parameters may be updated online, during engine operation, for example during operation of the vehicle. Online learning of air model parameters allows the air model performance to be improved in the presence of part-to-part variation and part aging. Example models are computationally tractable and generalizable, i.e. models do not exhibit the ill effects of over parameterization and are computationally simpler than other approaches.

Example air model calibration processes includes one or more of the following aspects. An air model is created using a throttle model and a cylinder flow model, and preferably both models are LP-SVR models. The throttle model and cylinder flow model input-output variables are measured on the engine to be calibrated, for example under a range of steady state operating conditions. Operating conditions can be chosen that sufficiently cover the engine operating space, for example using a design of experiments (DOE) statistical approach. The engine calibration data and SVR modeling techniques are used to produce the throttle and cylinder flow models, each model including a number of support vectors and associated weighting parameters. A first set of transient driving cycles are run on the engine, while measuring input-output variables again. Offline adaptation of the weighting parameters may then be achieved using the transient data and an optimization method, such as a least squares regression. The air model may then be validated using a second set of transient driving cycles.

In representative examples, the input variables to the air model include engine speed (rpm), variable valve timing (VVT), and throttle position. The input variables may include data originating from engine sensors and/or engine controller signals. The air model produces estimates of cylinder flow and manifold pressure. The estimated manifold pressure may be compared against a measured value, e.g. during calibration, adaptation or validation of the air model.

Examples of the invention also include online learning processes. A calibrated and validated air model is obtained, for example as described above. During engine operation, throttle air flow and manifold pressure are measured. The operating data is used to adjust the weighting parameters, so as to maintain model accuracy. The weighting parameters may be adjusted during periods of well excited and consistent engine operations. Opportunities to update the air model weighting parameters can be determined by checking for data consistency criteria, where there is no substantial contradiction in the engine behavior and the parametric model for a given period of time. Well excited engine operation data allows parameter estimation within a desired accuracy. The air model weighting parameters may then be updated online using any appropriate technique, such as a projection method.

Examples of the invention reduce the calibration burden for initial (offline) air charge estimation, i.e. the establishment of an accurate air model for an engine. Further, an online learning mechanism can be used to improve the air model performance in the presence of part-to-part variation and parts aging.

An example method of air charge estimation includes creating an air model for the engine including a throttle model and a cylinder flow model. The cylinder flow model (and/or the throttle model) may be a support vector regression (SVR) model, preferably a linear programming SVR (LP-SVR) model, including support vectors having associated weighting parameters. Throttle model and cylinder flow model input-output variables are measured for steady-state engine operation over a range of engine operating conditions, allowing the support vectors and the weighting parameters to be determined using steady-state engine operation data. The weighting parameters may then be adjusted using transient driving cycle data, while leaving the support vectors substantially unchanged. Adjusting the weighting parameters may include comparing the estimated manifold pressure determined by the air model with a measured manifold pressure, or using other comparisons of estimated and measured parameters. The air charge may then be determined during engine operation using the improved air model, allowing, for example, improved fuel economy to be achieved.

An example engine controller receives engine data, such as engine speed data, valve data, and throttle data. The engine controller determines the air charge using an air charge model including a throttle model and a cylinder flow model, the cylinder flow model (and optionally the throttle model) being a linear programming support vector regression (LP-SVR) model including a plurality of support vectors, each support vector having an associated weighting parameter. An improved method of engine controller calibration uses methods of air charge estimation herein, such as that described in the previous paragraph.

An improved engine controller may be further operable to modify the air charge model during engine operation by adaptive adjustment of the weighting parameters of the LP-SVR model(s). The weighting parameters may be adjusted using a projection method, or other method such as a least-squares based approach. Adaptive adjustment may adjust the weighting parameters, without necessarily adjusting the support vectors determined using engine controller calibration.

DETAILED DESCRIPTION OF THE PREFERRED EMBODIMENTS

A linear programming support vector regression (LP-SVR) based air model was developed for estimation of air charge, and shown to give good performance using engine data. Novel adaptation methods allow the model to be updated online, for example during vehicle operation. The use of LP-SVR modeling provides great benefits, allowing parameter adjustments to be made that reflect a wide range of engine operating conditions.

An offline calibration process can be used to determine initial parameters for the SVR based air model, such as support vectors and weighting parameters, and an online updating procedure can be used to modify the weighting parameters during vehicle operation. The support vectors may remain unchanged during adaptive updating.

Examples include improved methods of estimating the air charge for one or more cylinders during engine operation, an improved initial calibration process, and a method of model adjustments during vehicle operation.

Previous modeling efforts frequently included the use of an estimation lookup table. However, the combination of a modeling algorithm and a lookup table presents many problems. For example, the engine operating space may be divided into numerous cells, and it is then difficult to update the cells during operation of the vehicle. For example specific cells may be updated in response to specific engine operating conditions and measurements, but it is then difficult to propagate these updates through to other cells within the engine operating space. Serious problems involved with the use of lookup tables can be avoided using examples of the present invention.

Figure 1:
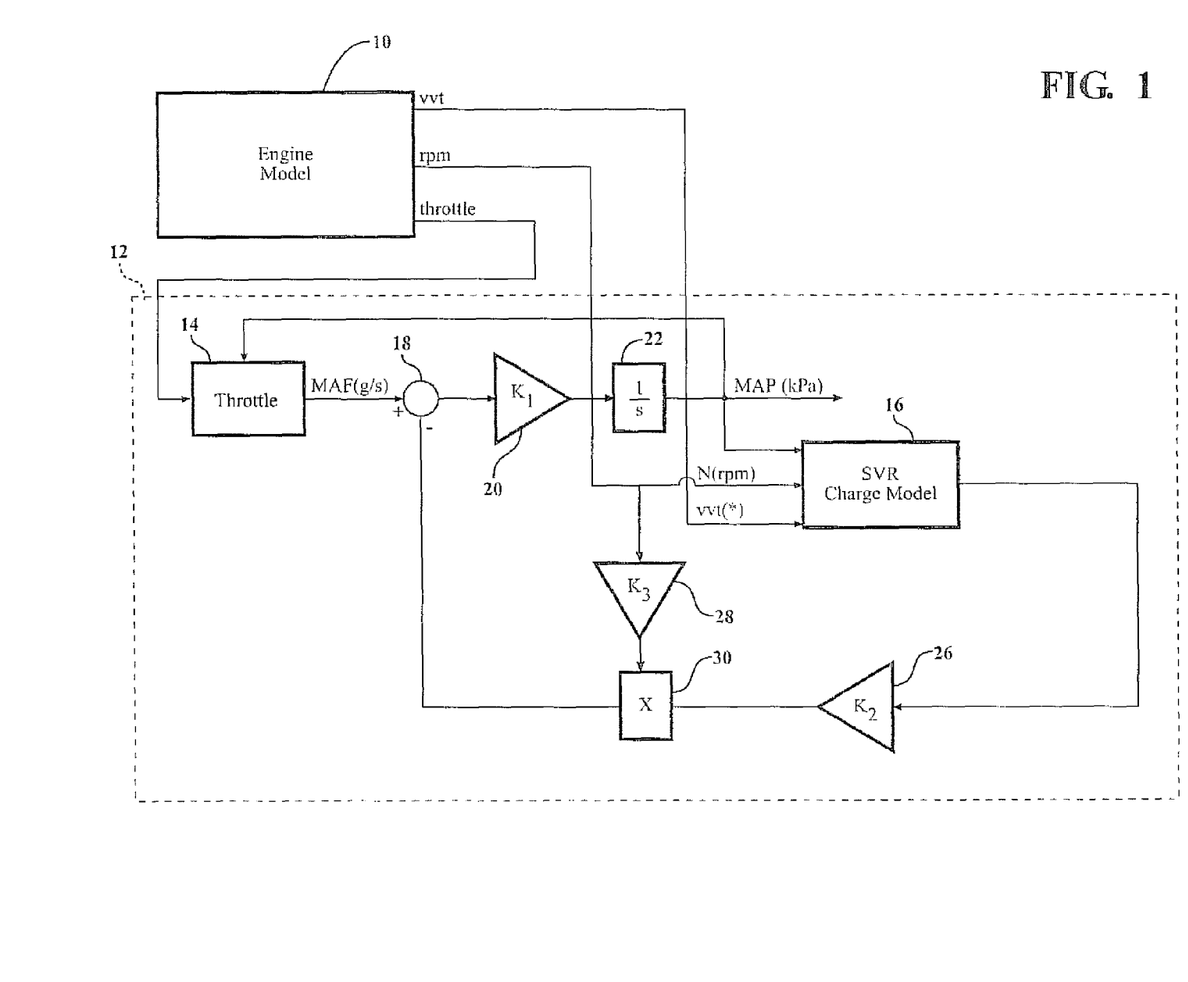
FIG. 1 shows a schematic of an example air model.

FIG. 1 shows a schematic of an example air model 12, including an SVR throttle model 14 and an SVR cylinder flow model 16. The air model was tested in simulations using an engine model 10, and the air model can further be tested using dynamometer data obtained from an engine of interest.

The engine model 10 (in simulations), or engine itself, provides engine data including variable valve timing (VVT), engine speed (RPM), and throttle position. These data represent air model external condition inputs, and may be sensor data or commands from an engine controller. The air model 12 is shown as including various computational elements within dashed box 12, and includes an SVR throttle model 14 (a model of throttle flow), and an SVR cylinder flow model 16 (a model of the emptying characteristics of the intake manifold, and hence of air flow into the cylinders). The air model may include a state to estimate manifold pressure dynamics.

The air model provides an estimate of manifold inlet flow (MAF), at the output of throttle model 14, and an estimate of manifold pressure (MAP). One or both of these estimates can be compared against actual measured values, during calibration or adaptive updating of the model parameters. For example, the weighting parameters in an LP-SVR model can be adjusted to minimize deviation between estimated and measured engine operating variables (such as the manifold pressure and throttle air flow). As discussed below, this may use least squares (LS) or other approaches, such as a projection method.

The model includes various tuning parameters, e.g. $K_1$-$K_3$, within elements 20, 26, and 28, respectively, and the estimate of manifold pressure (MAP) is produced by integrator element 22. The tuning parameters relate the model to characteristics of the physical system, such as the physical configuration and component dimensions. For example $K_1$ is correlated with the volume of the intake manifold.

Once calibrated, the output of the model allows an accurate estimation of air flow into the engine cylinders, and hence allows accurate control of the air/fuel ratio. If the air flow induction is accurately estimated and the fuel provided is known, the air/fuel ratio is accurately determined and may be controlled in an improved manner.

In some examples, the SVR throttle model is optional and may be replaced by a mass air flow sensor, giving a direct measurement of the throttle flow. In other examples, the throttle model is not an SVR model. However, an air model including an SVR throttle model was found to allow good estimation of the manifold flow (MAP) as shown to the right of element 14 (the throttle model) in FIG. 1, and MAP.

An example SVR approach which may be used in examples of the present invention is described in United States Patent Application 2009/0063115, Linear Programming Support Vector Regression with Wavelet Kernel. Other kernels, such as a radial basis function (RBF) kernel, may also be used in examples of the present invention. The air model shown above can be implemented in an engine controller, so that dashed line 12 represents the engine controller including the air model, and element 10 in FIG. 1 represents a source of engine data (such as an engine and associated sensors). An engine controller (or engine control unit) may have extensive additional functionality, as known in the art, for example receiving signals from driver inputs such as a throttle, and controlling engine operating parameters such as the air/fuel mixture, valve timing, and the like. The air model may be implemented in software executed by a processor within the engine controller.

Figure 2:
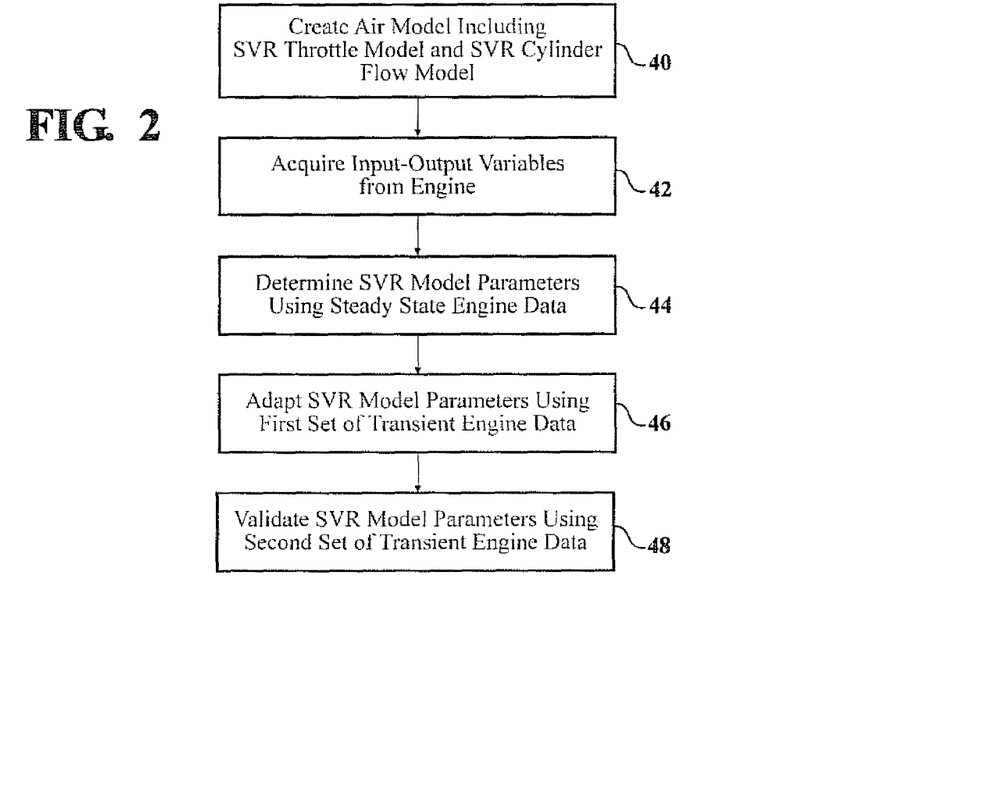
FIG. 2 is a flow chart of a model calibration and validation approach.

FIG. 2 shows an example method of calibrating the air model, which gave excellent results in simulations. Box 40 represents creating an air model including (optionally) a throttle model and an SVR cylinder flow model. Box 42 represents acquiring input-output variables for the air model from an engine (or an engine model, in the case of simulations). Box 44 represents determining SVR model parameters using steady state engine data, for example using, a plurality of engine speeds covering a range of normal engine operation speeds. Box 46 represents adapting the SVR model parameters using a first set of transient engine data. Box 48 represents validating the model using a second set of transient engine data.

Adaptive Updating

SVR models provide a parametric structure that allows easy and robust on-line adaptation. The support vectors (SV) may be fixed (e.g. after calibration step), and the SVR model is then in a natural linear parametric form with weights treated as the adjustable parameters.

Examples of the present invention allow far easier adaptation in response to engine data than previous approaches. Updating of LP-SVR models includes updating of linear parameters within the model. The updates are performed within an existing robust algorithm, and by updating the linear weighting parameters, the updates naturally propagate throughout the engine operating space.

Air models according to examples of the present invention allow adaptive control development and validation. The use of a linearly-parameterized model allows model parameters to be updated online, for example during vehicle operation. Weighting parameters associated with support vectors can be adjusted by adaptive updating, allowing improved air-fuel ratio control. Adaptive control algorithms allow compensation of uncertainties in air-charge estimation due to part-to-part variations, aging, and other changes in the physical process.

Figure 3:
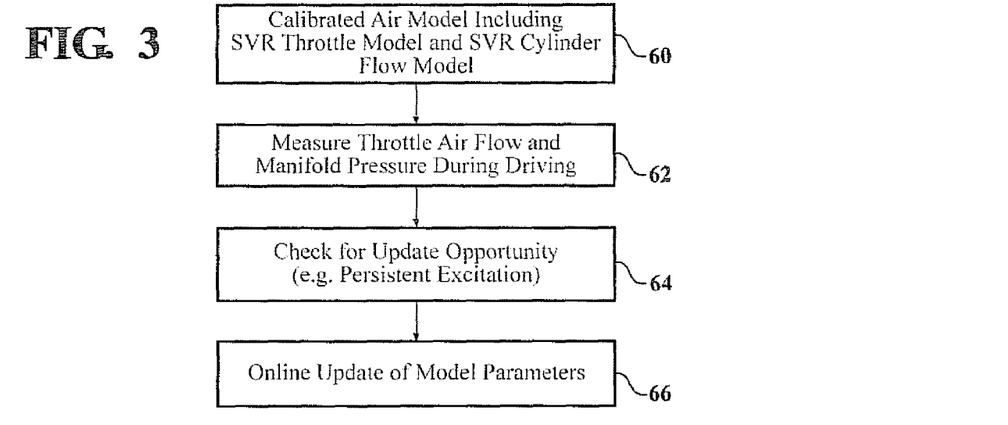
FIG. 3 is a flow chart of an adaptive update approach.

FIG. 3 shows an example adaptive control approach. Box 60 represents starting with a calibrated air model, such as that described above in relation to FIG. 2. Box 62 represents collecting engine data during driving or other engine operation, engine data may include throttle air flow, manifold pressure, and/or data corresponding to estimations available from the model. Box 64 represents checking for opportunities to update the air model. Some conditions will be excluded by Box 64 for adaptation, such as the conditions when several data points give inconsistent parameter update information or when there is lack of excitation (e.g., the same or similar data points are repeated so that the data is not well enough excited for accurate model parameter updating). Box 66 represents online updating of model parameters, the updated parameters being correlated with latest collected engine data.

Air Charge Model

The physical process of air intake and emptying of cylinders is reasonably well understood, and the dynamics of the process may be modeled using the general gas law. Hence, an LP-SVR model can be established in which the underlying algorithm is robust, and the weighting parameters can be adjusted according to either calibration or updated engine operating data.

A linear parametric air charge model can be derived from the intake manifold dynamic model. This may be determined from the general gas equation, for example $$\dot{P}_m(t) = \frac{\bar{R}T_{air}}{V_{intake}}\left(W_{throttle}(t) - W_{air\text{-}charge}(t)\right) \quad (1)$$

In Equation 1, $V_{intake}$ is the volume of the intake manifold, $\bar{R}$ is the specific gas constant for air, $T_{air}$ is the temperature of the air, $W_{throttle}$ is the mass flow through the throttle body into the intake manifold, and $W_{air\_charge}$ is the mass flow out of the manifold through the engine intake valves. The mass flow through the throttle body may be determined, as described above, using an SVR based model, or in some examples may be directly measured. Assuming uncertainties in the air charge estimation are well modeled by SVR, the parametric model was established without using signal derivatives:

$$y(t) = \theta^T \phi(t), \text{ where} \quad (2)$$

$$y(t) = \Lambda^{-1}\left(\frac{V_m}{RT_m}\frac{s}{\tau s+1}P_m(s) - \frac{1}{\tau s+1}W_{throttle}(s)\right) \quad (3)$$

$$\theta = \begin{bmatrix} \alpha_1 \\ \alpha_2 \\ \alpha_3 \\ \alpha_4 \\ \alpha_5 \\ \alpha_6 \\ \alpha_7 \\ \alpha_8 \end{bmatrix} \quad (4)$$

$$\phi(t) = \mathcal{L}^{-1}\left\{-\frac{1}{\tau s+1}\right. \quad (5)$$

$$\left.\mathcal{L}\left\{30Ne(t)\frac{P_{amb}V_{syl}}{RT_{amb}}\begin{bmatrix} K([Ne(t) \ VVT(t) \ P_m(t)] \ -SV_1) \\ K([Ne(t) \ VVT(t) \ P_m(t)] \ -SV_2) \\ K([Ne(t) \ VVT(t) \ P_m(t)] \ -SV_3) \\ K([Ne(t) \ VVT(t) \ P_m(t)] \ -SV_4) \\ K([Ne(t) \ VVT(t) \ P_m(t)] \ -SV_5) \\ K([Ne(t) \ VVT(t) \ P_m(t)] \ -SV_6) \\ K([Ne(t) \ VVT(t) \ P_m(t)] \ -SV_7) \\ K([Ne(t) \ VVT(t) \ P_m(t)] \ -SV_8) \end{bmatrix}\right\}\right\}$$

$K(.,.)$ is the kernel function, and $\alpha_i$ are the weights and $SV_i$ are the support vectors of the LP-SVR model. The signal $y(t)$ is synthesized from the intake manifold pressure $P_m(t)$ and throttle flow $W_{throttle}(t)$ as shown in Equation 3, where $\phi(t)$ is the regressor vector whose elements are derived from the kernel functions of the support vector model. Equation 4 shows the eight weighting parameters to be determined (and updated, in an adaptive model). The linear parametric model was evaluated first by determining how accurately the model replicated $y(t)$, and a linear least squares regression was used to determine the unknown weighting parameters ($\alpha_i$).

The symbol $\theta^*$ is used to represent an original model from an offline SVR-LP approach, and $\theta_{LS}$ represents batch linear least squares parameters from an initial time to a given time instant. Parameter estimates were determined using test cycle data, such as the US06 data, input to the linear parametric model.

Figure 4A:
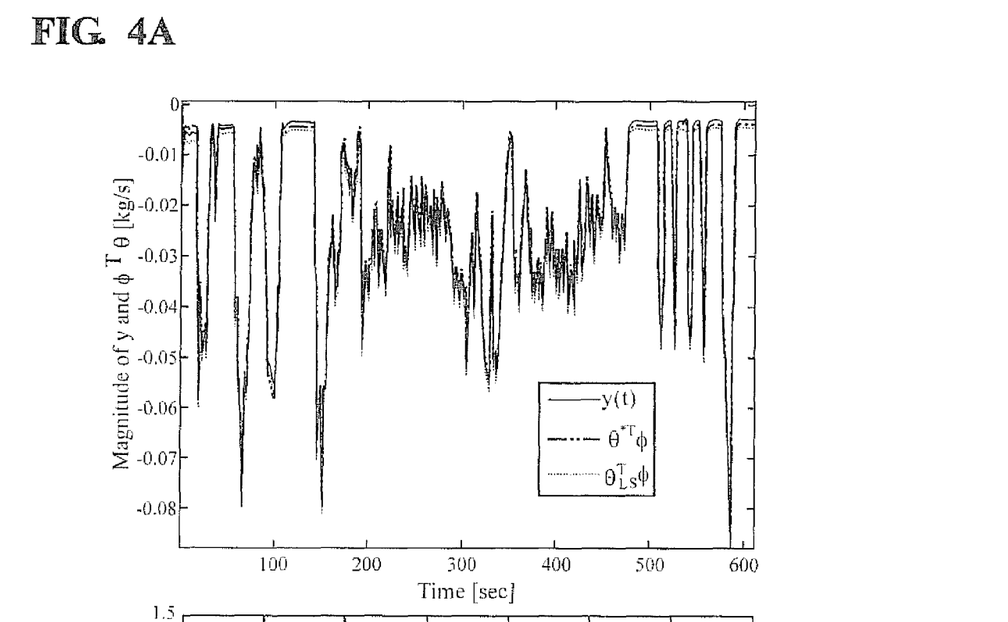
FIGS. 4A-4B show an evaluation of a linear parameter model using engine test data.
Figure 4B:
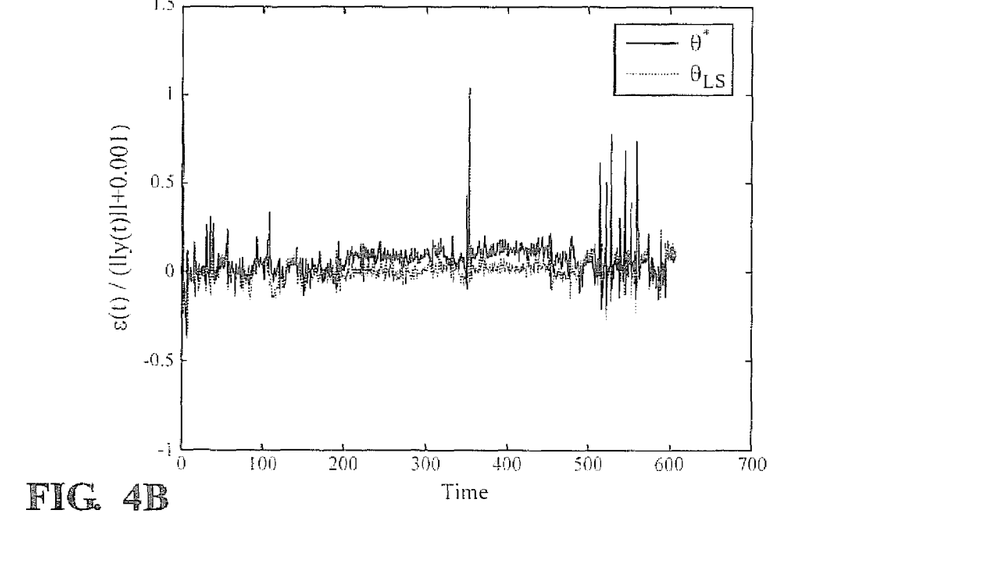

FIGS. 4A-4B show that $\theta^T\phi(t)$ accurately follows $y(t)$ for simulations using US06 experimental data. FIG. 4A compares the model data with $y(t)$, and FIG. 4B illustrates the normalized error for the two modeling approaches. These data validate the parametric model structure described above.

Adaptive Updating using Least Squares Approach

A recursive least squares approach to parameter estimation was developed to allow online adaptation of the model. In some examples, the RLS (recursive least squares) estimates did not converge to the SVR-LP parameters, and the LS regression found parameters that gave a reduced error relative to the initial calibration parameter set. In some examples, model parameters determined online using a RLS technique became erratic as additional engine data which does not provide proper excitation was used, suggesting an excess numerical sensitivity of the RLS algorithm. It was found that the information and covariance matrices became nearly singular and caused problems in the iteration algorithm in RLS.

One approach to avoiding the accumulation of error in the model parameters is to reset the covariance matrix when it becomes singular (its condition number becomes very large). This avoids the numerical sensitivity in RLS.

Covariance (P(t)) resetting was found to improve RLS performance greatly, but it may affect parameter convergence. The algorithm also requires updates on the covariance matrix, increasing numerical complexity in implementation.

The least squares (LS) and recursive least squares (RLS) algorithms successfully verified the linear parametric model, but more robust parameter regression algorithms and/or implementation methods may be preferred to counteract the numerical sensitivity of LS based solutions.

Other Approaches to Adaptive Updating, Including Projection Methods

In some examples, least squares or recursive least squares may be used to adjust the model parameters in response to calibration or model updating data. However, least squares optimization of the weighting parameters may depend on data distribution. In particular, if an engine is operated under certain conditions for a long time, the data collected starts to become redundant and the data used for model adaptation becomes skewed. This corresponds to repeating a test on an engine over and over again, and collecting the same information, which leads to over-weighting of that condition within the model, and skewing the covariance matrix.

A least squares approach may attempt to fit every data with equal importance. In scenarios which lack persistent excitation and have redundant operation data, the least squares approach may become excessively numerically sensitive to the data, and may give occasionally erratic results.

For LS optimization, improved adaptation of the model was found if the covariance matrix was reset in certain conditions. In effect, this corresponds to throwing away redundant data and collecting new data for performing updates of the algorithm.

More sophisticated parameter regression algorithms and/or other methods can be used to counteract the numerical sensitivity of LS or RLS solutions. Mitigating approaches include imposing constraints on $\|\beta\|$ in deriving the SVR model, imposing constraints in adaptation, performing partial parameter adaptation (e.g. grouping the parameters according to their sign), or putting limitations on the variation allowed in the parameters (e.g. fixing the first 3 or 4 significant digits and updating only the least significant digits.

These problems may be avoided using a projection algorithm, or other similar algorithm in which deviations from a previous estimate are included within the cost function of the optimization process. In simulations, a projection method was used to update the model during engine operation. This gave good performance with reduced numerical sensitivity, as it avoided the problem of over-responsive updating to individual data points. A projection algorithm considers the original parameters during the optimization process, and tries to stay as close as possible to the previous model parameters (such as weighting parameters) while including an adjustment for new data.

A projection algorithm implicitly imposes constraints on adaptation, and is a preferred approach to online adaptation of SVR model parameters. A projection algorithm allows constraints to be more easily imposed (relative to the least squares algorithm), and minimizes the distance between the new and old estimates.

An example projection algorithm formulation is:

$$\min J = \frac{1}{2}\|\theta(t) - \theta(t-1)\| \quad (6)$$

$$\text{subject to } y(t) = \theta(t)^T \phi(t)$$

The algorithm $$\theta(t) = \theta(t-1) + \frac{a\phi(t)}{c + \phi^T(t)\phi(t)}(y(t) - \theta(t-1)^T \phi(t)) \quad (7)$$

was evaluated for adaptive updating, where c>0 (to avoid singularity), and 0<a<2. The test conditions used an optimal SVR model derived using LP and tuned on steady state calibration set, and a perturbed SVR model in which various perturbations were introduced to the weighting parameters that led to 10-20% prediction error. Parameter adaptation was performed using US06 engine test data, and validation was achieved by checking the resulting models for dynamometer step change data sets.

Use of a projection algorithm led to performance improvement in all conditions. A least squares (batch) algorithm led to performance improvement in some conditions (low speed), but not in some others (typically high engine speed conditions).

Simulations showed that it can be helpful to avoid adaptation (weighting parameter adjustment) under certain conditions, an approach which may be termed filtered adaptation. These conditions included large and sudden changes in air model input parameters (e.g. in throttle and VVT data), situations where there is a poor signal to noise ratio, and when redundant data is being collected, as repeated collection of the same data points will skew the optimization results. Adaptation may also be stopped if inconsistent data is collected.

Other possible approaches include using an LP algorithm with constraint on the norm, adaptation for uncertainties in both throttle and cylinder flow estimation, and adaptation without a manifold pressure measurement. Adaptation may use any comparison of an estimated engine parameter with a corresponding measured or inferred value of that parameter.

The projection algorithm, in effect, attempts to stay as close as possible to the previous estimate, while fitting the available new data. For example, the projection algorithm may start with calibration data obtained offline, and adjust the model parameters according to operation data obtained during vehicle operation.

Hence an improved method of engine control includes determining a calibrated model for an engine, and using a projection algorithm to update the model during vehicle operation. An offline calibration provides data which is a good starting point for a projection algorithm or similar model optimization process.

Engine Controller

Examples of the present invention also include an engine controller (sometimes referred to as an engine control unit, ECU), for example an engine controller comprising a processor, memory, and input/output configurations. The engine controller receives engine data, such as engine speed, valve data, and throttle data, and uses such data as input data to an air model (including an LP-SVR throttle model and/or LP-SVR cylinder flow model), to provide an improved estimate of air charge for the engine. Model predictions can be compared with actual engine operating data, such as manifold pressure, to allow real-time updates of the model, and optimized engine operation even in the case of changing engine conditions.

An engine controller may use any method of air charge determination described herein, and may be calibrated using steady-state and transient engine operation data as described elsewhere in relation to improved air charge determination. The air charge model used by the engine controller may be adaptively updated.

Examples of the present invention include an adaptive engine controller which may use optimization of models based on received engine data. Example engine controllers allow improved performance that responds to engine variation. Example models and corresponding engine controllers allow optimized engine performance and improved gas mileage even in the presence of part-to-part variation, long term variations due to changes in the engine (such as deposit formation on the throttle body or engine intake valves), and variations in sensors or actuators.

The invention is not restricted to the illustrative examples described above. Examples described are not intended to limit the scope of the invention. Changes therein, other combinations of elements, and other uses will occur to those skilled in the art.

Having described our invention, we claim:

1. A method of estimating an air charge for an engine, the method comprising:
   providing an air model for the engine, the air model including both a throttle model and a cylinder flow model,
   the cylinder flow model being a linear programming support vector regression (LP-SVR) model including a plurality of support vectors having associated weighting parameters;
   transforming the air model to a linear parametric air model to allow online support vector regression learning;
   determining the support vectors and the weighting parameters for the LP-SVR model using steady-state engine operation data;
   adjusting the weighting parameters, while online, using a set of transient driving cycle data; and
   estimating the air charge during engine operation using the air model,
   wherein the linear parametric air model is established without using signal derivatives and expressed as:

$$y(t) = \theta^T \phi(t)$$

where $$y(t) = \Lambda^{-1}\left(\frac{V_m}{RT_m}\frac{s}{\tau s+1}P_m(s) - \frac{1}{\tau s+1}W_{throttle}(s)\right);$$

$$\theta = \begin{bmatrix} \alpha_1 \\ \alpha_2 \\ \alpha_3 \\ \alpha_4 \\ \alpha_5 \\ \alpha_6 \\ \alpha_7 \\ \alpha_8 \end{bmatrix};$$

$$\phi(t) = L^{-1}\left\{\frac{1}{\tau s+1}L\left[30Ne(t)\frac{P_{amb}V_{agt}}{RT_{amb}}\begin{bmatrix} K([Ne(t) & VVT(t) & P_m(t)] & -SV_1) \\ K([Ne(t) & VVT(t) & P_m(t)] & -SV_2) \\ K([Ne(t) & VVT(t) & P_m(t)] & -SV_3) \\ K([Ne(t) & VVT(t) & P_m(t)] & -SV_4) \\ K([Ne(t) & VVT(t) & P_m(t)] & -SV_5) \\ K([Ne(t) & VVT(t) & P_m(t)] & -SV_6) \\ K([Ne(t) & VVT(t) & P_m(t)] & -SV_7) \\ K([Ne(t) & VVT(t) & P_m(t)] & -SV_8) \end{bmatrix}\right]\right\};$$

$V_m$=intake manifold volume;
R=air specific gas constant;
$T_m$=intake manifold temperature;
$\tau$=filter time constant;
s=Laplace transform parameter;
L=Laplace transform;
$\Lambda^{-1}, L^{-1}$=inverse Laplace transform;
$P_m$=intake manifold pressure;
$W_{throttle}$=throttle air flow;
$\alpha_i$=SVR coefficients;
Ne=engine speed;
$P_{amb}$=ambient pressure;
$V_{cyl}$=cylinder volume;
$T_{amb}$=ambient temperature;
K=SVR Kernel function;
VVT=variable valve timing; and
$SV_i$=support vectors.

2. The method of claim 1, further including validating the weighting parameters using a second set of transient driving cycle data.

3. The method of claim 1, the throttle model being a linear programming support vector regression (LP-SVR) throttle flow model having a second plurality of support vectors.

4. The method of claim 1, the air model receiving engine data including variable valve timing data, engine speed data, and throttle position data,
   the air model providing an estimated throttle flow and an estimated manifold pressure.

5. The method of claim 4, wherein adjusting the weighting parameters includes comparing the estimated manifold pressure determined by the air model with a measured manifold pressure.

6. The method of claim 1, the air charge model being derived from an intake manifold dynamic model.

7. The method of claim 1, further including adjusting the weighting parameters during engine operation.

8. The method of claim 7, the weighting parameters being adjusted using a projection method during engine operation.

9. The method of claim 8, the weighting parameters being adjusted during periods of well excited and consistent engine operations.

10. The method of claim 1, the method being performed by an engine controller including a processor.

11. An apparatus, the apparatus being an engine controller for an engine,
   the engine controller being operable to receive engine data including engine speed data, valve data, and throttle data,
   the engine controller being operable to determine an air charge for the engine using an air charge model including both a throttle model and a cylinder flow model, the cylinder flow model being a linear programming support vector regression (LP-SVR) model including a plurality of support vectors having associated weighting parameters, the weighting parameters being adjusted while online using a linear parametric air model configured to allow online support vector regression learning, and wherein the linear parametric air model is established without using signal derivatives and expressed as:

$$y(t) = \theta^T \phi(t)$$

where $$y(t) = \Lambda^{-1}\left(\frac{V_m}{RT_m}\frac{s}{\tau s+1}P_m(s) - \frac{1}{\tau s+1}W_{throttle}(s)\right);$$

$$\theta = \begin{bmatrix} \alpha_1 \\ \alpha_2 \\ \alpha_3 \\ \alpha_4 \\ \alpha_5 \\ \alpha_6 \\ \alpha_7 \\ \alpha_8 \end{bmatrix};$$

$$\phi(t) =$$

$$L^{-1}\left(-\frac{1}{\tau s+1}L\left(30Ne(t)\frac{P_{amb}V_{agt}}{RT_{amb}}\begin{bmatrix} K([Ne(t) & VVT(t) & P_m(t)] & -SV_1) \\ K([Ne(t) & VVT(t) & P_m(t)] & -SV_2) \\ K([Ne(t) & VVT(t) & P_m(t)] & -SV_3) \\ K([Ne(t) & VVT(t) & P_m(t)] & -SV_4) \\ K([Ne(t) & VVT(t) & P_m(t)] & -SV_5) \\ K([Ne(t) & VVT(t) & P_m(t)] & -SV_6) \\ K([Ne(t) & VVT(t) & P_m(t)] & -SV_7) \\ K([Ne(t) & VVT(t) & P_m(t)] & -SV_8) \end{bmatrix}\right)\right);$$

$V_m$=intake manifold volume;
R=air specific gas constant;
$T_m$=intake manifold temperature;
$\tau$=filter time constant;
s=Laplace transform parameter;
L=Laplace transform;
$\Lambda^{-1}$, $L^{-1}$=inverse Laplace transform;
$P_m$=intake manifold pressure;
$W_{throttle}$=throttle air flow;
$\alpha_i$=SVR coefficients;
Ne=engine speed;
$P_{amb}$=ambient pressure;
$V_{cyl}$=cylinder volume;
$T_{amb}$=ambient temperature;
K=SVR Kernel function;
VVT=variable valve timing; and
$SV_i$=support vectors.

12. The apparatus of claim 11, the engine controller being further operable to modify the air charge model during engine operation by adjustment of the weighting parameters of the LP-SVR model.

13. The apparatus of claim 12, the weighting parameters being adjusted using a projection method.

14. The apparatus of claim 12, the weighting parameters being adjusted during engine operation by comparing a measured manifold pressure and an estimated manifold pressure determined by the air charge model.

15. The apparatus of claim 11, the throttle model being a linear programming support vector regression (LP-SVR) throttle model.

16. The apparatus of claim 15, the throttle model being adjusted during engine operation by comparing a measured throttle flow and an estimated throttle flow determined by the throttle model.

* * * * *